United States Patent [19]
Held

[11] Patent Number: 4,519,138
[45] Date of Patent: May 28, 1985

[54] AUTOMATIC DRAFTING DEVICE WITH ADJUSTING AID

[76] Inventor: Kurt Held, Alte Str. 1, D-7218 Trossingen 2, Fed. Rep. of Germany

[21] Appl. No.: 487,204

[22] Filed: Apr. 21, 1983

[30] Foreign Application Priority Data

Apr. 21, 1982 [DE] Fed. Rep. of Germany ....... 3214760

[51] Int. Cl.³ .............................................. B43L 24/00
[52] U.S. Cl. .................... 33/32 R; 33/18 R; 33/189
[58] Field of Search ................ 33/32 R, 18 R, 189, 33/191, 185 R

[56] References Cited

U.S. PATENT DOCUMENTS

| | | | |
|---|---|---|---|
| 2,583,578 | 1/1952 | Lowndes | 33/189 X |
| 2,618,860 | 11/1952 | Engelhart | 33/189 |
| 2,730,811 | 1/1956 | Gouldsmith | 33/189 |
| 2,934,829 | 5/1960 | Bohn | 33/189 |

FOREIGN PATENT DOCUMENTS 3104962 2/1981 Fed. Rep. of Germany .
348829 4/1957 Switzerland .

*Primary Examiner*—William D. Martin, Jr.
*Attorney, Agent, or Firm*—Toren, McGeady, Stanger

[57] ABSTRACT

In an automatic drafting device having a carriage with toothed wheels in meshed engagement with a toothed rack which extends across a planar drafting surface and with a control mechanism for controlling movement of a stylus on the carriage to effect drafting operations, there is provided an adjusting aid arranged at the stylus for determining a writing position and a compensating control mechanism for automatically compensating for the distance between the writing position determined by the adjusting aid and the position of the stylus, this compensation being performed when the distance is greater than zero.

8 Claims, 5 Drawing Figures

AUTOMATIC DRAFTING DEVICE WITH ADJUSTING AID

The present invention relates generally to automatic drafting devices and more specifically to a device which includes a carriage mounted on wheels or rollers for movement over a planar surface on which drafting may be effected, the carriage including a controllable writing device such as a stylus or the like and means for controlling movement or operation of the stylus during the drafting procedure.

In particular, the present invention is an improvement in the type of drafting device described above and disclosed in U.S. patent application Ser. No. 347,968, filed Feb. 11, 1982 now U.S. Pat. No. 4,455,751 issued June 26, 1984.

In devices of the type to which the present invention relates, if a mark or symbol is to be written on a drafting surface with a numerically controlled writing or drafting device, the accuracy of the location where the writing occurs is significant. If the writing is to be effected at a determined position on the writing plane with an error of less than 0.2 mm, then the drafting mechanism must be capable of alignment of the writing device or stylus at the desired position with a rapid and secure operation with such positioning being accomplished by eye and manually by the operator of the drafting device. Usually, an adjusting or sighting aid is provided.

The recording styluses or writing devices of numerically controlled drafting mechanisms are freely adjustable in accordance with the judgment of the operator by sight. This manner of operation requires that the operator or draftsman utilize visual techniques and normally such operators or draftsman are well trained in estimating parallaxes and small distances.

However, location errors of less than 0.2 mm are usually fortuitous and it has been found that a positioning of the stylus of, for example, to an accuracy of 0.05 mm cannot be consistently obtained by manual techniques.

The present invention is directed toward providing a mechanism for overcoming the disadvantages discussed above which is capable of compensating for error in the positioning of the stylus in numerically controlled automatic drafting devices so that an exact writing position can be achieved in a relatively simple manner. More specifically, the invention is directed toward providing a mechanism whereby accurate positioning may be achieved by the operator or draftsman simply by adjusting the writing device or stylus by sight at a position on the drafting surface provided for the accurate positioning of a mark or sign to be written wherein the distance between the writing position determined by an adjusting aid and the position actually occupied by the writing point during adjustment may be automatically compensated for by a control before writing if this distance is greater than zero.

SUMMARY OF THE INVENTION

Briefly, the present invention may be described as an automatic drafting device having a carriage upon which a stylus is located, the stylus including a writing tip which is adapted to write upon the planar surface of a drafting board or other support. The carriage is mounted on a toothed rack and toothed wheels on the carriage engage with the toothed rack for moving the carriage and the stylus along the drafting surface. Movement of the stylus relative to the carriage is controlled in order to control writing by the writing tip on the drafting surface and the invention is particularly directed toward an adjusting aid which is mounted on the carriage in close proximity with the writing tip in order to enable the operator of the drafting device to locate and determine a desired writing position. Once the writing position has been determined, the distance between the writing position and the writing tip is compensated for by moving the writing tip through an equivalent distance so that it will be located at the writing position when the distance determined by the adjusting aid between the writing position and the writing tip is greater than zero.

In accordance with the more detailed aspects of the invention, the adjusting aid may be in the form of a centering magnifier, a reticle, a pin diaphragm, a sighting notch or other similar devices.

In accordance with a further more detailed aspect of the invention, the adjusting aid may be constructed in the form of a flexible light guide or mirror having a beam of bundled light transmitted on the drafting surface to mark the writing position at the intersection with the drafting surface wherein the distance between the writing position and the stylus position is compensated by said compensating control means.

Advantages obtainable with the adjusting or centering aid of the invention arise particularly due to the possibility for reducing the time required for drafting operations, increasing the positioning accuracy and the striking accuracy, and also in the ability to provide lower demands on the working accuracy of the draftsman or operator. If the centering or adjusting aid in accordance with the invention is constructed as a magnifier, then the advantage of the enlargement of, for example, a lead pencil cross or line end showing the centering position in connection with, for example, an annular marking effected around the optical axis of the magnifier, may provide a reduction in positioning error by a factor of 10.

Also, a pin diaphragm whose diameter is approximately three times greater than the thickness of the dimension or measuring reference lines and dimension lines in the techical drawings, will facilitate and expedite placing of the dimension line points without light loss that is unavoidable with magnifiers.

A transparent reticle is especially suitable for adjusting figures or characters in preprinted column or line work for example piece lists in welding part drawings.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
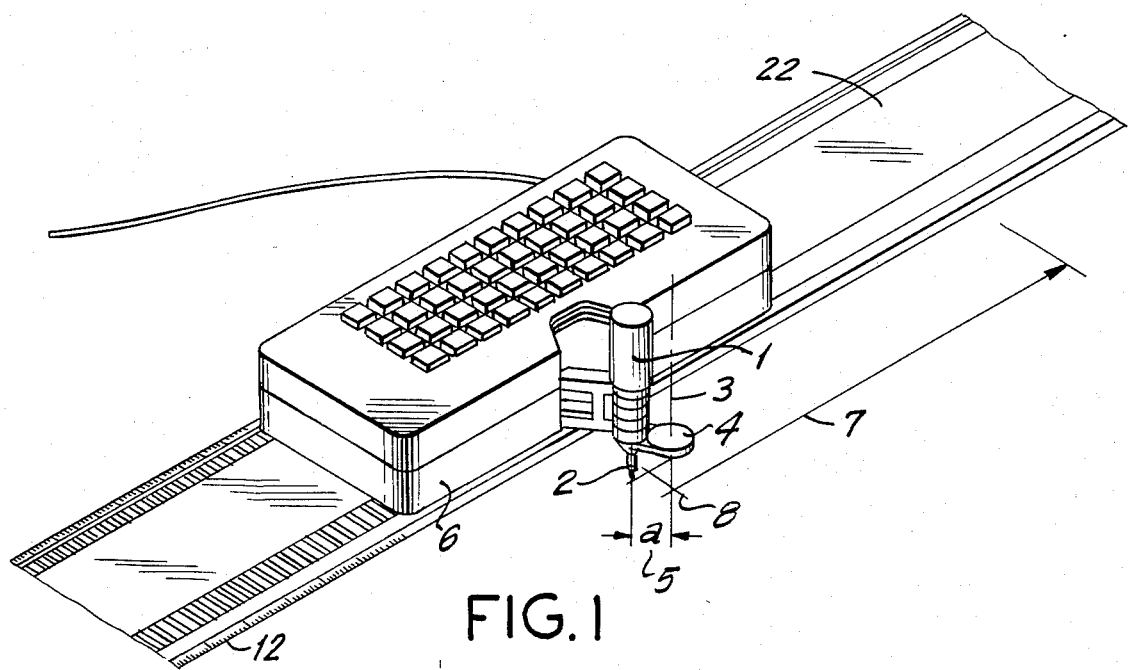
FIG. 1 is a perspective view of an automatic drafting device embodying the present invention.

In FIG. 1 an automatic drafting device is illustrated and it includes a generally rectangularly shaped carriage 6 with a keyboard on its upper surface.

Figure 2:
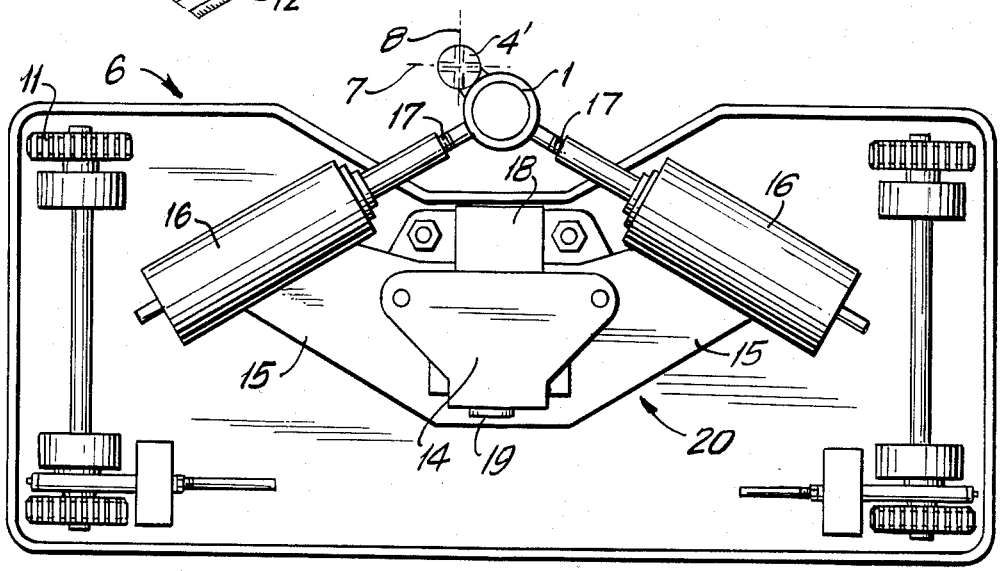
FIG. 2 is a schematic plan view of the carriage forming a part of the drafting device of FIG. 1 showing parts of the operating mechanism thereof.

In FIG. 2 it can be seen that the carriage 6 is mounted on toothed wheels or rollers 11 which mesh with a rectilinear toothed rack 22. The toothed rack 22 has a pair of rack tracks over which the toothed wheels 11 can be moved. The rack tracks extend in the long direction of the carriage with each of the wheels extending across each short side of the carriage being engaged in a different track.

A stylus holder 1 is mounted on the carriage 6 and is located outwardly from one of the long sides of the carriage. A writing instrument with a writing tip or stylus 2 is supported in the stylus holder and extends downwardly so that it can write characters, symbols or text on a writing or drafting surface below the stylus holder. The rack 22 is located on or directly above the drafting surface.

In FIG. 1, a scale 12 extends along the long sides of the rack 22 to facilitate dimensioning of the drawing or drafting surface over which the carriage rides.

The stylus holder 1 extends generally perpendicularly of the rack 22 and the planar drafting surface over which the carriage moves. In FIG. 2, a pivot device 14 is shown within the carriage located approximately midway along one of the long sides. Pivot device 14 includes leaf springs 15 extending laterally from both of its sides in the long direction of the carriage. A hollow shaft motor 16 is located at each of the opposite ends of the leaf springs 15 and the motors extend obliquely of the long direction of the carriage outwardly toward the stylus holder 1. Each hollow shaft motor 16 has a threaded spindle 17 which projects outwardly from the carriage and supports the stylus holder 1. The spindles 17 are secured to the stylus holder at angularly spaced positions about its periphery. A direct current motor 18 with an eccentric disc 19 is arranged in the carriage to raise and lower a writing pressure regulation device 20 made up of the pivot device 14, the leaf springs 15, the hollow shaft motors 16 and their spindles 17 and the stylus holder 1. By means of the direct current motor 18, the pressure applied to a writing instrument mounted in the stylus holder 1 can be effectively regulated.

The control of the carriage is provided by a control unit, not shown, in which programs are stored. The programs can be selected by the keyboard on the carriage. Accordingly, the control of the stylus holder for writing or drawing a character or symbol on the drafting surface and an instruction for driving the toothed wheels 11 of the carriage 6 can be provided from the control unit. After the writing tip 2 of the writing instrument mounted in the stylus holder places the desired character or symbol on the drafting surface, the carriage can be moved to the desired spacing, for instance one or more character spacing, into position to write the next character or symbol. Slippage of the carriage is avoided, since the toothed wheels 11 mesh in the tracks of the rectilinear rack 22. While the characters are being applied to the drafting surface by the instrument in the stylus holder 1, the carriage 6 is held in a stationary position, and accordingly, no distortion of the characters can take place.

The drafting mechanism described in the foregoing is generally in accordance with the mechanism described in application Ser. No. 347,968, filed Feb. 11, 1982.

In accordance with the present invention, the stylus holder 1 is provided with adjusting aid means which, in the embodiment depicted in FIG. 1, comprise a preferably aplanatic magnifier 4 which is arranged on the stylus holder 1 near the stylus 2, the magnifier 4 having an optical axis 3 which is arranged a distance a from the writing point or stylus 2. The magnifier 4 serves as an adjusting aid for the eye of the draftsman to enable alignment of the carriage 6, for example in order to locate the stylus 2 at the end of a dimension line 7 given by means of a dimension reference line 8, in order to produce for example a left dimension line arrowhead at this position upon the planar drawing surface upon which the dimension line 7 is located.

By actuation of a corresponding operating key, the stylus point 2 may be displaced or offset by the distance a which is shown at a location 5 without writing contact by means of the operating program and, subsequently, with lowering of the stylus point 2 in the position fixed with the magnifier 4, a mark or symbol, in this case a dimension arrowhead, may be drafted or drawn.

A magnifier 4' is shown in top view in FIG. 2 wherein there is shown an enlargement of the dimension line 7 and the dimension reference line 8 which is accomplished by means of the magnifier 4' as well as the obvious facilitation of the accurate device adjustment by means of the enlargement of the determining drawing detail in connection with, e.g., an annular marking around the optical magnifier axis.

Figure 3:
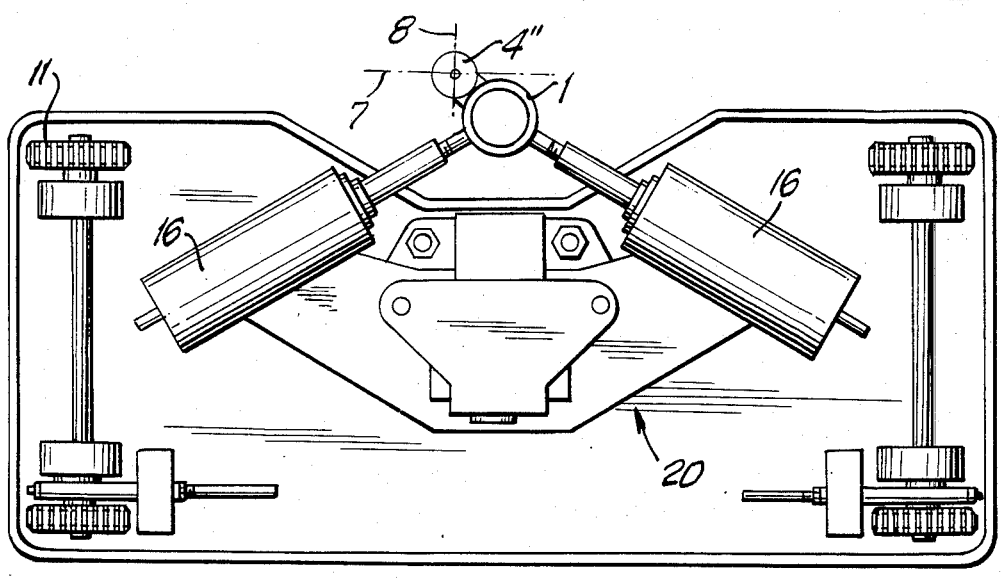
FIGS. 3 and 4 are schematic plan views showing different embodiments of the invention.

FIG. 3 shows an adjusting aid in accordance with the invention in the form of a pin diaphragm 4''. In this instance, the operator makes use of the fact that the human eye may judge small dimensions, in this case the position divergences of the line intersections 7, 8 from the center of the diaphragm hole, in a particularly accurate manner so that they may be corrected with the assigned hand of the user.

Figure 4:
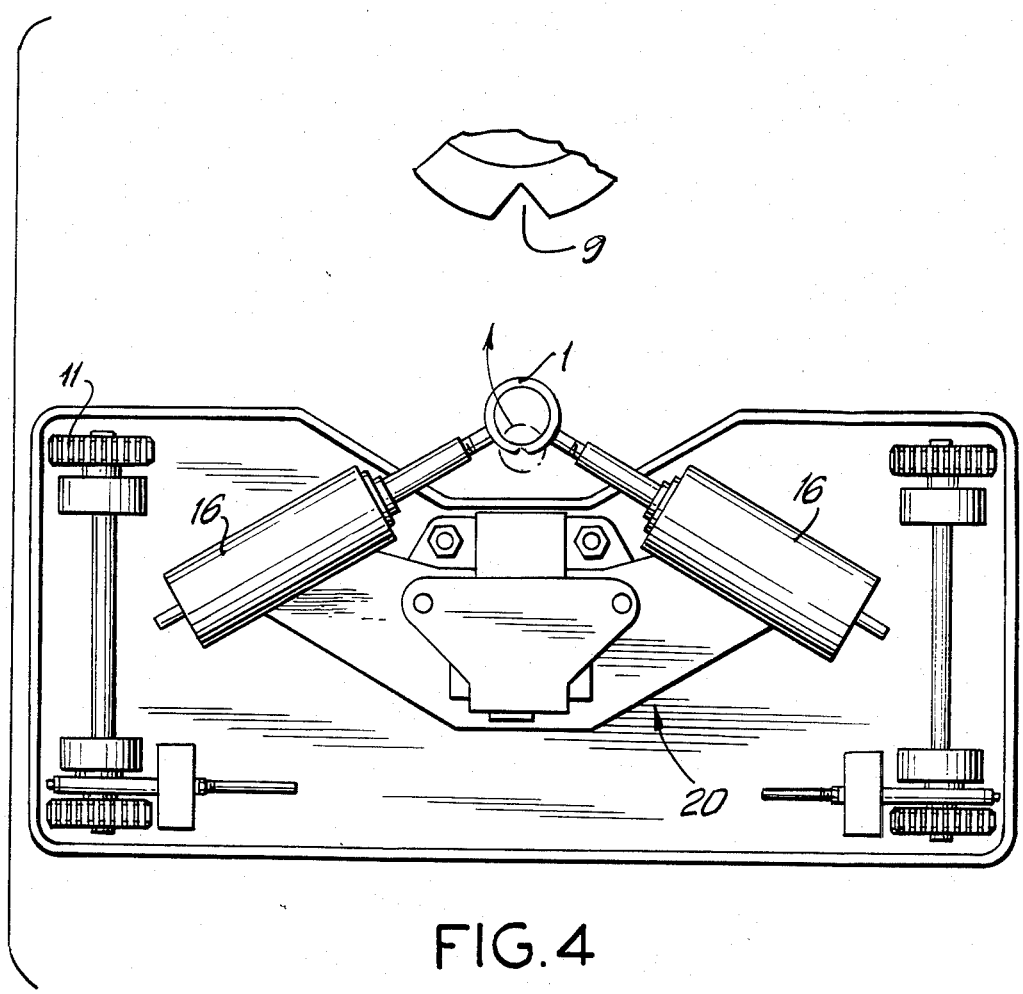

FIG. 4 shows a wedge-shaped or cuneiform groove 9 which is formed in a conical outer surface of the stylus means or writing joint, whose direction and position are arranged in such a manner that a sighting line arranged through the base of the groove penetrates the drafting surface at the placement point of the stylus tip 2. Here, also, the capability for analysis of the human eye for fine details and distances is made use of for accurate adjustment of the stylus point of the device.

Figure 5:
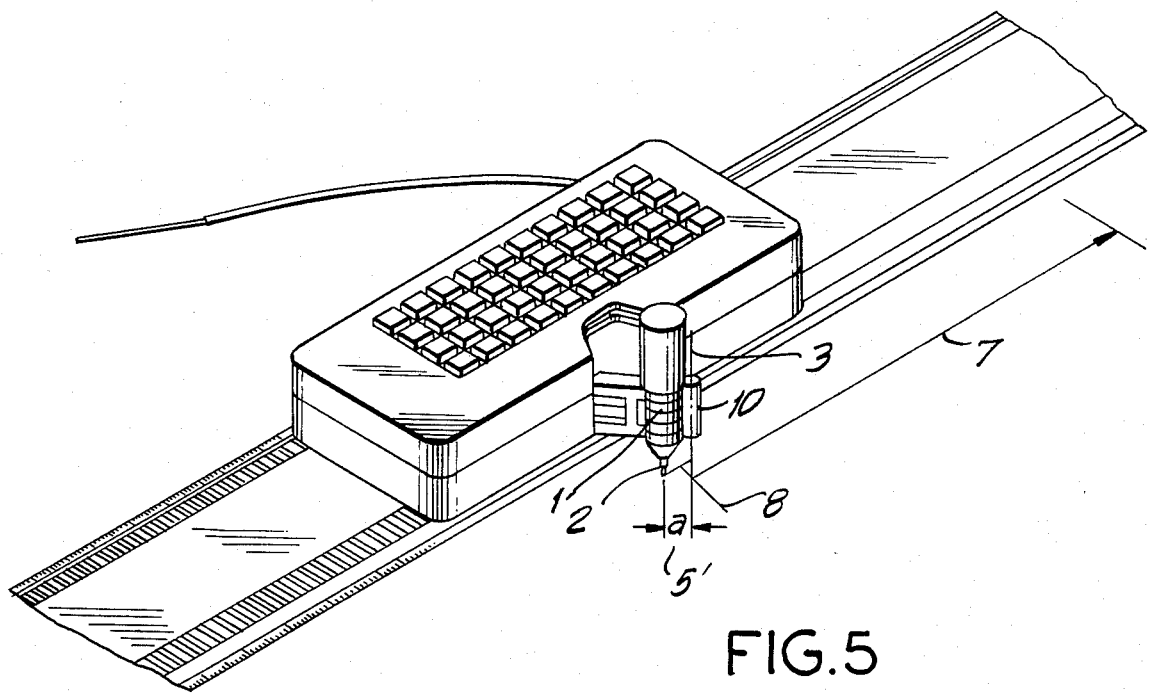
FIG. 5 is a perspective view showing a further embodiment of the invention.

In FIG. 5 there is shown an adjusting aid in accordance with the present invention which is in the form of a member 10 capable of developing a beam of bundled light transmitted on the drafting surfaces by means of the flexible light guide 10 or a mirror (not shown). The intersection of the light with the drafting surface marks the writing position and the distance of the light from the writing or stylus point 2 is corrected by the control of the device as described previously herein.

Thus, it will be seen that the invention is basically directed toward an adjusting aid for numerically controlled drafting devices of the type disclosed in application Ser. No. 347,968, filed Feb. 11, 1982, wherein a path-controlled stylus holder or writing instrument retainer which is raised from the drafting surface for positioning on the drafting starting point and which is lowered or pressed on for writing on this surface may be accurately positioned. The device which is arranged at a close distance from the stylus point is composed for example of a centering magnifier, a reticle, a pin diaphragm, or the like with the aid of which a draftsman or operator may adjust the writing device on the proposed position of the writing surface wherein, with the assistance of a control mechanism, the distance between the writing position determined with the adjusting aid and the position actually occupied by the writing instrument or stylus point during adjustment is automatically compensated before writing if this distance is greater than zero.

While specific embodiments of the invention have been shown and described in detail to illustrate the application of the inventive principles, it will be understood that the invention may be embodied otherwise without departing from such principles.

What is claimed is:

1. An automatic drafting device comprising:
   a carriage having stylus means mounted thereon for writing upon a planar drawing surface, said stylus including a writing tip;
   a toothed rack having said carriage mounted thereon;
   toothed wheels on said carriage engaging with said toothed rack for moving said carriage and said stylus means along said planar drawing surface;
   means controlling movement of said stylus means relative to said carriage for controlling writing by said writing tip on said drafting surface;
   adjusting aid means on said carriage arranged at said stylus means in close proximity to said writing tip for determining a writing position; and
   compensating control means for automatically compensating for the distance between said writing position and said writing tip when said distance is greater than zero by effecting displacement of said writing tip through a compensating distance equal to said distance between said writing position and said writing tip to bring said writing tip to said writing position.

2. A device according to claim 1 wherein said adjusting aid means comprise a centering magnifier.

3. A device according to claim 2 wherein said centering magnifier is an aplanatic magnifier.

4. A device according to claim 1 wherein said adjusting aid means comprise a reticle.

5. A device according to claim 1 wherein said adjusting aid means comprise a pin diaphragm.

6. A device according to claim 1 wherein said adjusting aid means comprise a member having a sighting notch formed therein, said sighting notch being arranged in such a way that a line of sight extending through said sighting notch will intersect said drawing surface at said writing position.

7. A device according to claim 1 wherein said adjusting aid means comprise a flexible light guide producing a beam of bundled light transmitted onto said drawing surface to mark said writing position at an intersection with said drawing surface, said distance between said writing position and said stylus means being compensated by control of said device.

8. A device according to claim 7 wherein said adjusting aid means comprise a mirror.

* * * * *